United States Patent [19]

Cowles

[11] 4,035,763

[45] July 12, 1977

[54] WIRELINE TOOL FOR MEASURING BOTTOM-HOLE PRESSURE IN PUMPING WELLS

[75] Inventor: Christopher S. Cowles, Houston, Tex.

[73] Assignee: Shell Oil Company, Houston, Tex.

[21] Appl. No.: 685,821

[22] Filed: May 12, 1976

[51] Int. Cl.[2] .......................................... G01V 1/40

[52] U.S. Cl. .......................... 340/18 FM; 340/18 R

[58] Field of Search .... 340/18 CM, 18 FM, 18 NC, 340/18 R

[56] References Cited

U.S. PATENT DOCUMENTS

| | | | |
|---|---|---|---|
| 3,212,598 | 10/1965 | Anderson | 340/18 CM |
| 3,255,353 | 6/1966 | Scherbatskoy | 340/18 FM |

*Primary Examiner*—Harvey E. Behrend

[57] ABSTRACT

A data transmission system for use in transmitting data from a well to a surface location. The well data is converted to a voltage and used to control the frequency of an oscillator whose output frequency is transmitted to the surface. At the surface a second voltage-controlled oscillator is adjusted until its frequency and phase matches the signal transmitted from the well. The voltage required to match the frequency of the second oscillator to the frequency of the transmitted signal is then equal to the value of the well data.

6 Claims, 3 Drawing Figures

WIRELINE TOOL FOR MEASURING BOTTOM-HOLE PRESSURE IN PUMPING WELLS

BACKGROUND OF THE INVENTION

The present invention relates to telemetering circuits and particularly to circuits designed for telemetering information from deep wells to a surface location. In the drilling and production of oil and gas wells it is necessary to transmit information relating to measurements made at the bottom of the well to a surface location. For example, in the case of producing wells, downhole-pressure surveys are periodically conducted to determine the condition of the producing formation. Downhole-pressure surveys are used to determine the extent of plugging of the formation by sand and other conditions that may decrease production.

Present bottom-hole pressures are determined by using a wireline to lower a pressure-measuring device into the well and allowing it to remain in the well for a predetermined length of time. The pressure-measuring instrument measures the pressure and records it on a self-contained recording device. After the pressure measurements are made, the instrument is withdrawn from the well and the record examined.

There have also been attempts to provide a pressure-measuring device that can be lowered into a well on a wireline which contains an electrical circuit so that the downhole pressure measurements can be transmitted to the surface where they are recorded. In the past, these instruments have consisted of an elongated instrument capsule and a two-conductor wireline circuit. The measured pressure is transmitted as an analog electrical signal to the surface where it can be recorded. The distortion in the signal in its transmission over the wireline, of course, produces a corresonding error in the pressure measurements.

BRIEF SUMMARY OF THE INVENTION

The present invention solves the above problems by providing a downhole tool which is formed from a number of small tubular links with the individual links connected together by flexible means to form an elongated instrument capsule. The necessary downhole measuring and electronic circuits are placed in the links and the information from the downhole instrument package is transmitted to the surface over a single conductor cable. For example, the cable may consist of conventional flexible steel cable which is provided with a suitable insulating coating. Information is transmitted to the surface by means of the capacitive coupling between the cable and the well casing and thus, a single conductor is sufficient. This type of transmission circuit is more particularly described and claimed in U.S. Pat. No. 3,928,841. At the surface the information is detected and recorded to provide a record of the downhole pressure measurements.

The downhole electronics includes a voltage-controlled oscillator whose frequency is controlled by an analog voltage signal that represents the magnitude of the downhole measurement. For example, in the case of pressure the analog voltage would represent the pressure measurement. The oscillator frequency is transmitted to the surface where it is detected by a second circuit having a voltage-controlled oscillator that is the duplicate of the downhole oscillator. Thus, by matching the frequency and phase of the surface oscillator with the received signal, one obtains an analog voltage signal that is an exact duplicate of the downhole signal. The use of the voltage-controlled oscillator at the surface to match the characteristics of the downhole oscillator eliminates any compensation for the nonlinearity of the oscillators and relatively low-cost electronics may be used for both the downhole instrument and the surface electronics. In constrast, when the data is transmitted as a frequency, the downhole oscillator must be compensated to provide agreement between data and the oscillator frequency.

BRIEF DESCRIPTION OF THE DRAWINGS

The present invention will be more easily understood from the following detailed description of a preferred embodiment when taken in conjunction with the attached drawings in which.

PREFERRED EMBODIMENT

Figure 1:
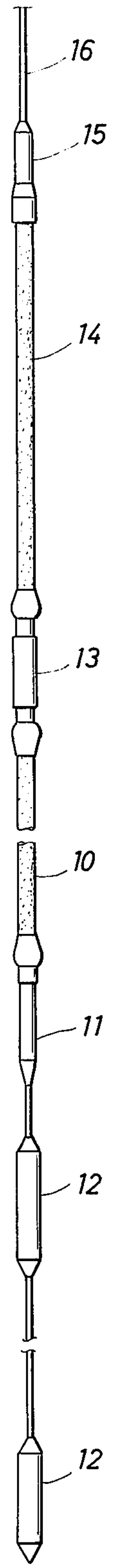
FIG. 1 is an elevation view of the downhole measuring instrument.

Referring now to FIG. 1, there is shown the downhole instrument capsule which comprises a number of flexible links 10 joining together rigid links, two of which are shown at 11 and 13. The rigid links may comprise tubular steel members having a relatively small diameter, for example, 0.6 to 0.7 inches and in any case a diameter that is smaller than the annular space between the production tubing and the well casing. The tubular members have a short overall length, for example in the range of 2 to 3 inches. The flexible members 10 comprise high-pressure flexible hose such as that used in hydraulic service. Each of the flexible members is provided with fittings on each end to which the tubular members may be attached. At the bottom end of the member there is provided a series of short weight members 12 which may have a diameter for example of 0.6 inches and a length of roughly 3 inches. The weight members may be connected to each other and to the end of the instrument package by a flexible steel cable. The upper end of the instrument is provided with a relatively long length of flexible hose 14 having a suitable end fitting to which the well cable 16 is coupled. As explained above, the cable 16 may be a conventional, flexible steel cable which is provided with an outer insulating coating, for example, an extruded polyethylene or polypropylene coating.

The electronics can be installed inside of the tubular members by using presently-available integrated circuits and wiring the components together directly without the use of any substrate or circuit supporting members. The electronics can then be installed in the tubular members and held in place by filling the tubular members with suitable potting compounds. The above construction provides a flexible elongated instrument package which may be easily inserted into the well and lowered to the bottom without shutting down production from the well. For example, conventional side openings at the well head including a wireline lubricator may be used for inserting the member into the well.

The downhole electronics utilizes a suitable pressure measuring device, for example, a diaphram strain gage of the monolithic silicon integrated type which is bonded directly to a diaphram may be used. This type of diaphram strain gage provides a temperature-compensated output voltage which is considerably greater than a conventional strain gage while retaining good linearity characteristics.

Figure 2:
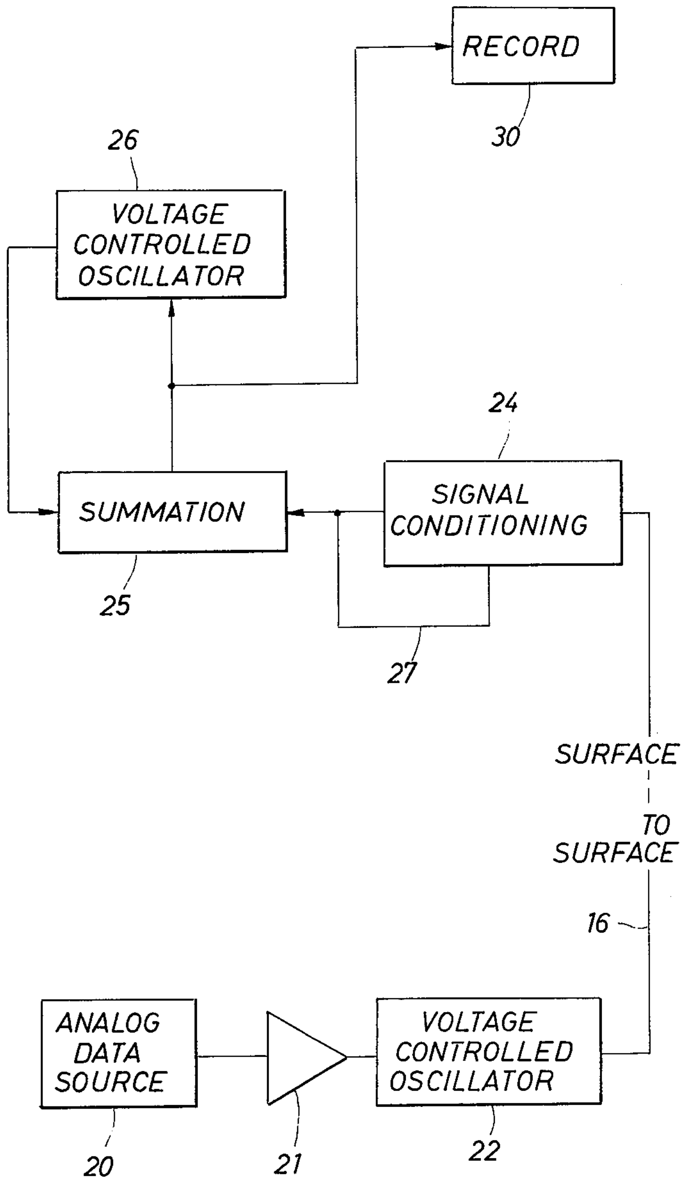
FIG. 2 is a block diagram of the downhole and surface electronics.

The output voltage of the strain gage is represented as a data source 20 in FIG. 2. The voltage is supplied to a combination differential amplifier and low-pass filter 21 which serves the purpose of both filtering the frequency response of the transducer while providing an output signal having a voltage range that is compatible with the voltage-controlled oscillator 22. It has been found that a frequency range of 1 kHz to 3 kHz operates satisfactorily to provide an accuracy of plus or minus 5 psi when measuring pressures in the 0–2,000 pound range. The output of the voltage-controlled oscillator is supplied to the cable 16 for transmitting to the surface.

As explained in the above-referenced patent, the transmission over the cable 16 is the result of electrical capacitance existing between the case of the downhole instrument package and the well casing. Since the wireline also has capacitive coupling between the wireline and the casing, a capacitive voltage divider is formed and the magnitude of the signal voltage appearing at the surface between the wireline and the well casing will be in an inverse proportion to the ratio of the values of the two capacitances. Normally, the capacitance between the wireline and the casing will be roughly a thousand times greater than the capacitance between the instrument package and the casing. This will produce a minimum signal of approximately 3 millivolts, peak to peak, at the surface when a signal of approximately 3 volts, peak to peak, is applied at the downhole end of the cable.

The surface electronics consists of a signal-conditioning unit 24 that includes an automatic-gain-controlled amplifier. The amplifier normalizes the voltage signal while removing any common-mode voltage which may exist between the receiver and the wellhead. The singal-conditioning unit 24 also includes a suitable band-pass filter for removing the normal-mode noise which is outside of the 1–3 kHz data band. The normalized signal is further conditioned by converting to a fixed amplitude square wave which may be used as one input signal to the phase detector of a phase-locked loop. The phase-locked loop consists of a phase detector circuit 25 and a voltage-controlled oscillator 26. The voltage-controlled oscillator is identical with the oscillator 22 in the downhole instrument. Thus, when the phases and, consequently, the frequencies are identical, the detector circuit 25 will provide a voltage to the voltage-controlled oscillator 26 which is identical with the voltage from the analog data source 20. This voltage may be recorded on a recorder 30 to provide a continuous record of the downhole pressure.

Figure 3:
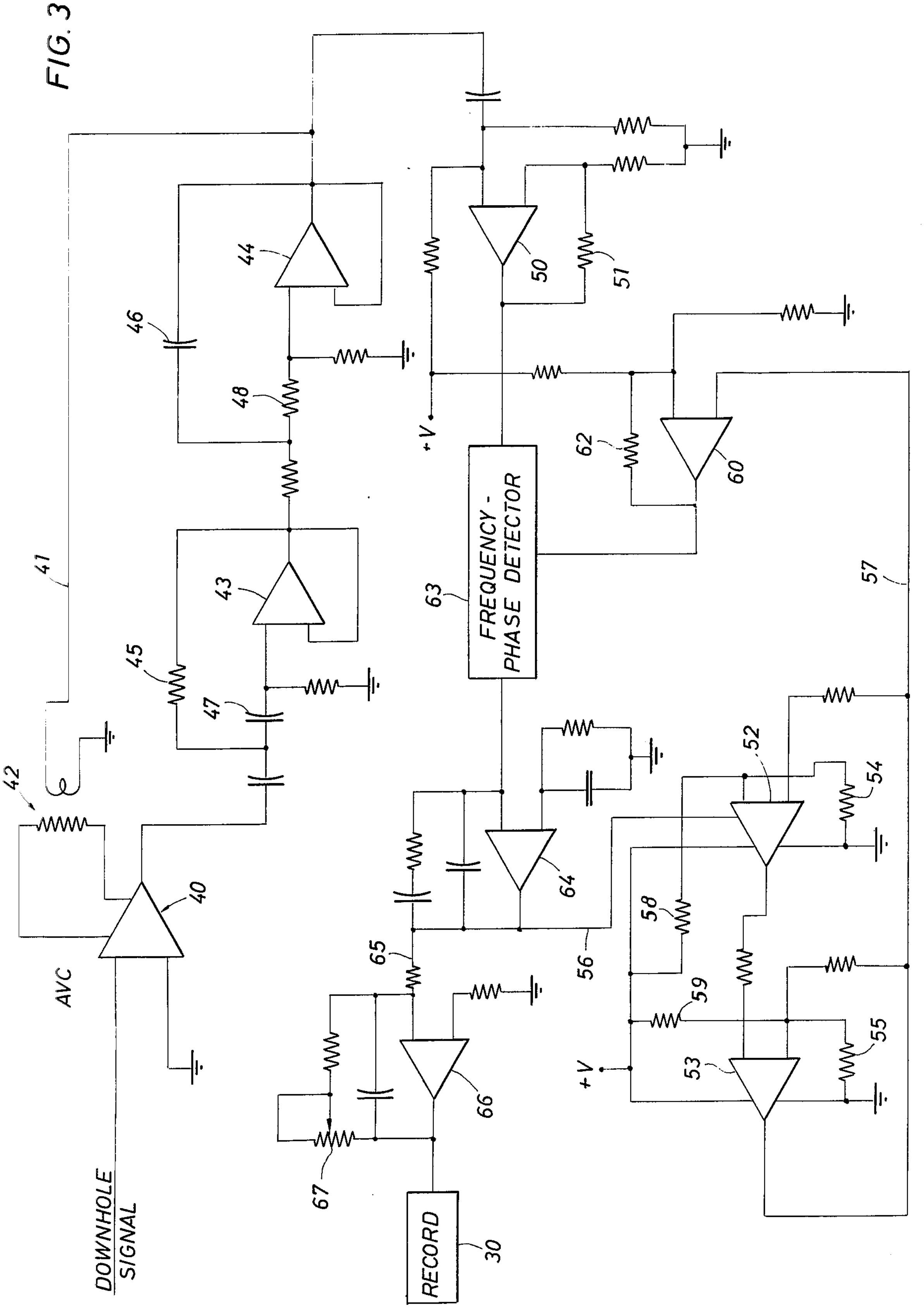
FIG. 3 is a schematic diagram of the surface electronics.

Referring now to FIG. 3, there is shown a schematic diagram of the surface recording system. The downhole voltage-controlled oscillator is identical to the voltage-controlled oscillator described below. As shown, the downhole signal is supplied to an automatic-gain-controlled amplifier 40 for normalizing the downhole signal. The amplification of the amplifier is controlled by a lamp-photoresistor combination 42 which receives a feedback signal from the band-pass filter. The output of the gain-controlled amplifier is supplied to the band-pass filter that consists of two operational amplifiers 43 and 44. The amplifier 40 is capacity-coupled to the amplifier 43 that is provided with a feedback circuit including a resistance 45 and capacitor 47. The amplifier 43 is resistance coupled to the second amplifier 44 that is provided with a feedback circuit that includes capacitor 46, resistance 48. The combination of the two amplifiers 43 and 44 and their feedback circuits provide a band-pass filter that removes substantially all signals outside of the 1–3 kHz data band.

The output signal from the amplifier 44 is supplied to a fast-response operational amplifier 50 which converts the sinusoidal data signal to a square-wave signal. The use of square-wave signals simplifies the means for determining the phase and frequency of the signal. The operational amplifier 50 is provided with a feedback circuit including resistance 51. The amplifier 50 should be provided with limiting circuits so that the fast amplification, in combination with the limiting circuits, provides a square-wave output.

The voltage-controlled oscillator is constructed from two programmable operational amplifiers 52 and 53. These amplifiers have an input for controlling the bias current and thus the slewing rate of the amplifier. This provides a means for using an analog voltage to control the frequency of the output signal from the oscillator. The two amplifiers should be coupled to the supply voltage V with voltage dividers 54–58 and 55–59. The output signal from the combination of the two amplifiers is supplied by lead 57 to a second fast-acting amplifier 60 which serves to convert the sinusoidal output to a square-wave signal. The square-wave signals from the amplifiers 50 and 60 are supplied to a frequency-phase detector 63 which may, for example, be an integrated circuit supplied by the Motorola Corporation and referred to as Model MC 4044. The frequency-phase detector will determine the difference in frequency between the two input signals as well as the phase difference and supply a single analog output voltage related to this difference. The analog voltage is amplified and filtered by a low-pass filter formed from an operational amplifier 64 having suitble feedback circuits. The low-pass filter filters all the high frequency noise which may pass through the frequency-phase detector and passes only the analog signal. This analog is supplied by lead 56 to the amplifier 52 of the voltage-controlled oscillator and by a lead 65 to a conditioning amplifier 66. The amplifier 66 has the feedback circuit including a variable resistance 67 that serves to adjust the gain of the amplifier. The output from the conditioning circuit can be supplied to the recorder 30 shown in FIG. 2.

The use of the oscillator at the surface to match the frequency of the downhole oscillator eliminates the need and complication of linearizing the two oscillators. The oscillators only require temperature compensation, which is relatively simple and inexpensive. Further, due to the fact that the surface oscillator is part of a phase-locked loop, it is capable of locking to the frequency of the downhole oscillator and maintaining it.

I claim as my invention:

1. A data transmission system for use in transmitting data from a data source located in a well to the surface, said system comprising:

a first voltage-controlled oscillator, said first oscillator being located in said well and the data source being coupled to said oscillator to control the frequency of the oscillator;

a single-conductor cable, said oscillator being coupled to said cable;

a second voltage-controlled oscillator, said second voltage-controlled oscillator being located at the surface; and a frequency-phase detecting circuit located at the surface, both said second oscillator and said cable being coupled to said frequency-phase detector, said frequency-phase detector being disposed to detect the difference in frequency and phase between said first and second oscillators and convert said difference to an analog voltage signal, said analog voltage signal being used to control said second oscillator to match the frequency and phase of said second oscillator with the frequency and phase of said first oscillator.

2. The data transmission system of claim 1 in which said first and second oscillators are temperature compensated.

3. An apparatus for measuring the downhole pressure of a producing well comprising:

a plurality of elongated rigid instrument capsules, said capsules having a diameter less than the smallest annular clearance between the well casing and the production tubing;

a plurality of flexible connectors, one of said connectors being secured at opposite ends to adjacent ones of said capsules to form a continuous flexible elongated instrument package;

a weight, said weight being attached to one end of the instrument package;

a pressure transducer, said pressure transducer being mounted is one of said capsules and supplying an electrical analog signal related to the downhole pressure in said well;

a voltage-controlled oscillator, said oscillator being mounted is one of said capsules and coupled to said pressure transducer;

a cable, said cable being connected to the other end of said instrument package to raise and lower said instrument package in the well, said oscillator being coupled to said cable;

a second voltage-controlled oscillator located at the surface;

a phase and frequency comparing circuit, said second oscillator and said cable being coupled to said comparing circuit, said comparing circuit producing a voltage to match the frequency and phase of the second oscillator with the frequency and phase of the downhole oscillator; and means for recording the voltage produced by said comparing circuit.

4. The system of claim 1 and, in addition, a band-pass filter coupled to said single-conductor cable at the surface to pass the frequency band of the data.

5. The system of claim 4 and, in addition, a low-pass filter coupled to the frequency-phase detecting circuit to remove all high frequency signals from said analog voltage.

6. The system of claim 3 wherein said pressure transducer consists of a diaphram strain gage of the monolithic silicon type.

* * * * *